June 17, 1930.  C. OMAN  1,764,339

ELECTRICAL MEASURING INSTRUMENT

Filed Aug. 9, 1924

INVENTOR
Carl Oman
BY
ATTORNEY

Patented June 17, 1930

1,764,339

UNITED STATES PATENT OFFICE

CARL OMAN, OF SWISSVALE, PENNSYLVANIA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed August 9, 1924. Serial No. 731,054.

My invention relates to electrical measuring instruments and particularly to induction meters.

One object of my invention is to provide an instrument, of the above indicated character, in which the movable element shall rotate in substantially fixed relation to a circuit load, irrespective of temperature variations in the instrument.

Another object of my invention is to provide a watthour meter that shall be so compensated for leading and lagging power factors as to accurately register the consumed energy under all conditions of operation.

In a watthour meter of the induction type, the flux from the series poles is in phase with the current in the series windings and, at unity power factor, the flux from the shunt pole is ninety degrees out of phase with the current in the shunt winding. Consequently, at unity power factor, where the current and voltage are in phase, the fluxes from the series and shunt poles are ninety degrees out of phase, producing a composite actuating flux in fixed relation to the circuit load and rotating the meter element in accordance with the energy or watthour consumption.

As the power factor of the circuit leads or lags, the shunt current leads or lags the series current, resulting in a displacement between the series and shunt fluxes which causes the meter element to rotate faster or slower in accordance with the degree and direction of power factor change.

In an endeavor to have the meter operate accurately at all power factors, it has been usual to provide a closed circuit loop of copper or other material on the shunt pole.

The resistance of the loop may be selected to cause the meter to operate accurately at all power factors under constant temperature conditions. However, changes in temperature cause the resistance of the loop to vary, thereby changing the phase-angular relation of the series and shunt fluxes and causing a corresponding error in the meter reading.

It is my aim to overcome the above mentioned objection and to provide a meter that shall operate in substantially fixed relation to its load under all temperature and power-factor conditions.

Accordingly, in practicing my invention, I provide a meter, the series and shunt fluxes of which are both compensated by closed circuit loops of such construction, relation and temperature coefficients as to compensate for both power factor and temperature changes in a manner permitting the accurate operation of the meter at all times.

Figure 1:
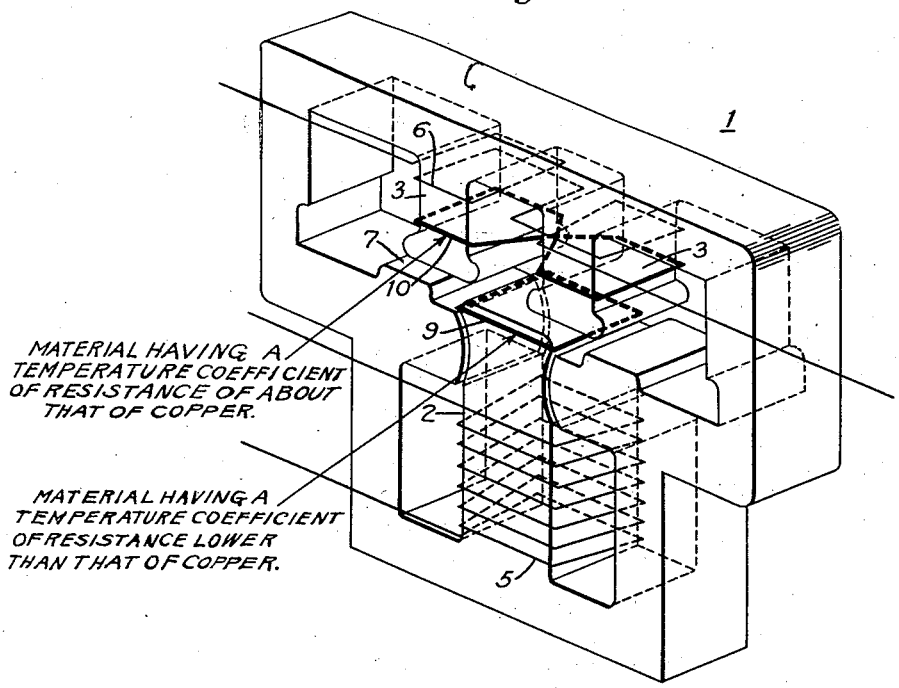
Figure 2:
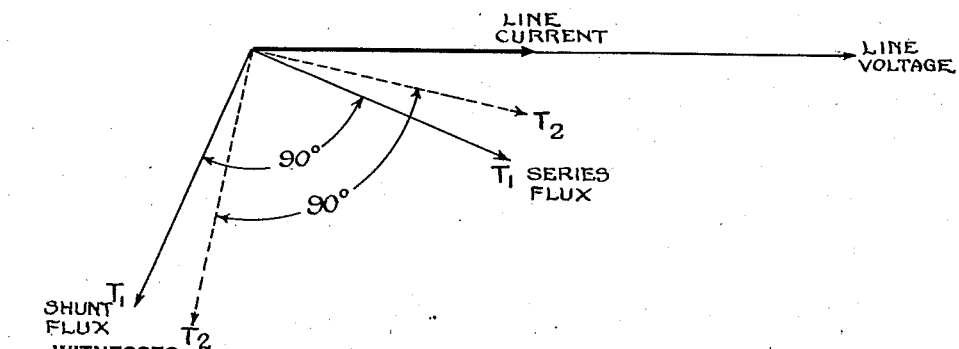

Figure 1 of the accompanying drawing is a perspective view of the field-magnet structure of a watthour meter, with its usual coils and the closed circuit loops of my invention represented diagrammatically, and Figure 2 is a vector diagram showing a relation between the line current and voltage and the meter fluxes.

The device comprises, in general, a laminated field-magnet structure 1 of usual construction having a shunt pole portion 2 and a pair of series pole portions 3. A voltage coil 5 and current coils 6 are disposed on the pole portions 2 and 3, respectively, and are adapted for connection to a circuit in a usual and well-known manner.

The usual copper or aluminum disk for operation in the air gap 7 between the pole portions 2 and 3, together with the meter shaft, registering mechanism and other standard parts have been omitted from the drawing for simplicity and clearness and because the construction and operation of these parts are so well-known to those versed in the art as to be deemed unnecessary of illustration in the drawing for a full and complete understanding of the invention.

A closed circuit conducting loop 9 embraces the shunt-pole portion 2 at a position adjacent to the air gap 7. It has been usual to place a closed circuit loop at this position, as above explained, but not a loop of the particular characteristics or for the same purpose as the loop 9, as will hereinafter be set forth.

As hereinbefore explained, a loop in the place of the loop 9 has heretofore been provided to alone compensate for changing power factor. Such a loop has been subject to changes in resistance which caused errors in the meter operation, as described. However, in the present construction, the loop 9 co-operates with another closed circuit loop 10 on the series pole portions 3. The loop 10 is formed to the shape of a figure eight, the ends of which surround the pole portions 3 in opposite directions in accordance with the direction of flux flow in these poles that is determined by the series coils 6 which are also wound oppositely around the pole portions 3.

The loop 9 is constructed of brass or other suitable material having a lower temperature coefficient than the loop 10 which may be of copper or other material so that the resistances of the loops change at different rates with changing temperature. With the resistance values of the loops 9 and 10 originally selected or adjusted to properly compensate the meter for power-factor changes and with the differential temperature resistance change properly balanced, the actuating flux from the pole portions 2 and 3 will be maintained in substantially constant relation to the load for all power-factor and temperature conditions within the range of the instrument.

This may be more clearly understood from a consideration of Fig. 2, in which the line current and voltage and the series and shunt fluxes are shown in their relation at unity power factor. At this power factor, the line current and voltage are in phase.

$T_1$ is assumed to be the temperature at which the meter has been calibrated and $T_2$ another temperature.

At temperature $T_1$, the series and shunt fluxes are ninety degrees apart. At temperature $T_2$, the shunt flux has assumed a new position by reason of a change in the resistance of the shunt loop 9 and the shunt coil 5. The phase-angle error, referred to as occurring in the prior art meters, would here be introduced, if the series flux did not also assume a new position, as indicated.

However, by reason of a change in the resistance of the copper loop 10 on the series poles, the series flux assumes the new position and thus maintains the angle between the fluxes at a constant value of ninety degrees.

At any other power factor, the angle between the series and shunt fluxes is $(90-x)$ degrees, where $x$ is the angle that the current lags or leads the voltage, $x$ being positive for lagging current and negative for leading current.

Thus, as above explained for unity power factor conditions, the value of the angle $(90-x)$ degrees will be retained independent of temperature changes.

While I have shown and described a particular form of my invention, changes may be effected therein without departing from the spirit and scope thereof, as set forth in the appended claims.

I claim as my invention:

1. The combination with an electro-responsive device comprising voltage and current means for creating a plurality of co-operating fluxes therefor, of means responsive to temperature changes for inductively affecting said fluxes and maintaining the same in substantially constant phase relation during persistence of substantially the same phase angle between the voltage and current producing said fluxes.

2. The combination with an electro-responsive device comprising voltage and current means for creating a plurality of co-operating fluxes therefor, of a plurality of stationary differentially co-operating means responsive to temperature changes and inductively affecting said fluxes for maintaining the same in substantially constant phase relation during persistence of substantially the same phase angle between the voltage and current producing said fluxes.

3. In an induction meter, the combination with means for creating angularly displaced actuating fluxes, of stationary means for simultaneously inductively affecting each of said fluxes in response to temperature changes to maintain said fluxes in substantially constant phase relation during persistence of substantially the same phase angle between the voltage and current producing said fluxes.

4. In an induction meter, the combination with a field-magnet structure having a plurality of pole portions and means for energizing the pole portions to provide angularly displaced actuating fluxes for the meter, of stationary means on said pole portions responsive to temperature changes for inductively affecting each of said fluxes and maintaining the same in substantially constant phase relations during persistence of substantially the same phase angle between the voltage and current producing said fluxes.

5. In an induction meter, the combination with a field-magnet structure having a plurality of pole portions and means for energizing the pole portions to provide angularly displaced actuating fluxes for the meter, of differentially acting closed-circuit loops on said pole portions responsive to temperature changes for affecting each of said fluxes and maintaining the same in substantially constant phase relation for a given power factor of the load being measured by said meter.

6. In an induction meter, the combination with a field-magnet core member having a shunt pole portion and a pair of series pole portions, of a closed-circuit loop of predetermined temperature coefficient extending around the series pole portions, and a closed-circuit loop of different temperature coefficient surounding the shunt pole portion.

7. In an induction meter, the combination with a field-magnet core member having a shunt pole portion and a pair of series pole portions, of a closed-circuit loop of predetermined temperature coefficient extending around the series pole portions in reverse directions, and a closed-circuit loop of lower temperature coefficient surrounding the shunt pole portion.

8. The combination with an electro-responsive device comprising means for creating a plurality of co-operating alternating fluxes therefor, of stationary means responsive to temperature changes for inductively affecting each of said fluxes and maintaining the same in substantially constant phase relation during persistence of substantially the same phase angle between the current and voltage producing said fluxes.

9. The combination with a magnetizable structure in which alternating fluxes are produced, respectively, by the current and voltage of an electrical circuit, of stationary means responsive to temperature changes for inductively affecting and maintaining said fluxes in substantially constant phase relation during persistence of substantially the same phase angle between the current and voltage.

10. In an induction meter, the combination with a magnetizable structure comprising shunt and series pole portions, and closed loops of conducting material inductively related, respectively, to said shunt and said series pole portions, said closed loops of conducting material having different temperature coefficients of resistance.

11. The combination with a magnetizable structure having portions in which fluxes are produced, respectively, by the current and the voltage of an electrical circuit, of means for maintaining said fluxes in substantially constant phase relation when subjected to temperature changes during persistence of substantially the same phase angle between said current and said voltage comprising closed-circuit loops of materials having different temperature coefficients of resistance inductively related, respectively, to the portions of said magnetizable structure in which said current and said potential fluxes are produced.

12. The combination with a magnetizable core and current and voltage means for producing a plurality of coacting alternating fluxes in said core, of means for maintaining said fluxes in substantially unchanging phase relationship upon changes in temperature and during persistence of substantially the same phase angle between the current and voltage producing said fluxes comprising separate coils of different temperature coefficients of resistance coacting with said flux producing means.

13. The combination with a current winding and a voltage winding for producing a plurality of coacting alternating fluxes, of means for maintaining the phase angle between said fluxes substantially fixed, during persistence of substantially the same phase angle between the current and voltage producing said fluxes, regardless of temperature changes, comprising induction means having different temperature coefficients of resistance associated with said current and voltage windings.

14. In an electricity meter, the combination with a movable element, of shunt and series torque producing circuits therefor, variations in temperature tending to cause variations in the phase relationship between the fluxes of said shunt and series torque-producing circuits and stationary means associated with said torque-producing circuits for influencing the fluxes thereof whereby tendencies to variations in the phase relationship between the fluxes of said shunt and series circuits under constant load conditions of said series circuit will be substantially obviated.

15. In an electricity meter, the combination with a movable element, of shunt and series torque-producing circuits therefor, variations in temperature tending to cause variations in the phase relationship between the fluxes of said shunt and series torque-producing circuits, and stationary means responsive to temperature variations inductively related to said torque-producing circuits for influencing the fluxes thereof whereby tendencies to variations in the phase relationship between the fluxes of said shunt and series circuits, under constant load condition of said series circuit, will be substantially obviated.

16. An electric meter of the induction type comprising a rotor, a magnetizable member having potential and series windings thereon, temperature-error compensating means cooperating with said potential winding, and means associated with said series winding and coacting with said temperature-error compensating means for maintaining substantially fixed the phase angular relationship between the fluxes of said potential and series windings during persistence of substantially the same phase angle between the current and voltage producing said fluxes, regardless of temperature changes, 17. An electric meter of the induction type comprising a rotor, a magnetizable member having potential and series windings thereon, a lag loop for said potential winding and a lag loop for said series winding, said lag loops having dissimilar temperature coefficients of resistance for maintaining substantially fixed the phase angular relationship between the fluxes of said potential and series windings, during persistence of substantially the same phase angle of the current and voltage producing said fluxes, regardless of temperature changes.

In testomony whereof, I have hereunto subscribed my name this 2nd day of August, 1924.

CARL OMAN.